United States Patent [19]

Olson

[11] Patent Number: 4,790,070
[45] Date of Patent: Dec. 13, 1988

[54] WIRE CUTTER INCLUDING CLIPPED WIRE RETAINING MEANS

[76] Inventor: James H. Olson, 3735 Linda La., Racine, Wis. 53405

[21] Appl. No.: 943,506

[22] Filed: Dec. 19, 1986

[51] Int. Cl.$^4$ .............................................. B25F 3/00
[52] U.S. Cl. ......................................... 30/134; 29/450
[58] Field of Search .................... 30/134; 29/450, 451, 29/509

[56] References Cited

U.S. PATENT DOCUMENTS

| | | | |
|---|---|---|---|
| 2,302,810 | 11/1942 | Steegmuller | 30/134 |
| 2,323,497 | 7/1943 | Strout | 30/134 |
| 2,715,769 | 8/1955 | Liscomb | 30/134 |

Primary Examiner—Frank T. Yost
Assistant Examiner—Willmon Fridie, Jr.
Attorney, Agent, or Firm—Glenn A. Buse'

[57] ABSTRACT

The wire cutter includes a pair of elastomeric gripping members mounted in the throat of the wire cutter and having closely spaced, opposed, inner faces which extend generally perpendicularly to the cutting plane of the cutting edges and clamp a short segment of wire therebetween as it is clipped from a larger section of wire. The gripping members preferably are made from a polyurethane elastomer and preferably are cast or formed in situ by pouring a liquid mixture of a polyurethane prepolymer and curing agent in the pocket defined by the throat and, in some cases, a mold surrounding the wire cutter jaws.

11 Claims, 1 Drawing Sheet

U.S. Patent  Dec. 13, 1988  4,790,070
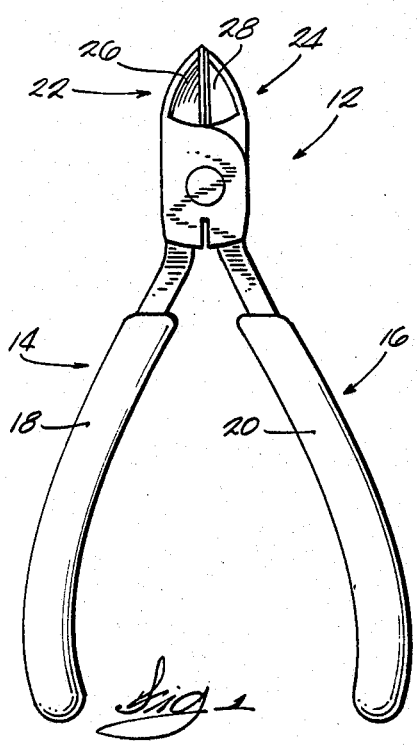
Fig. 1
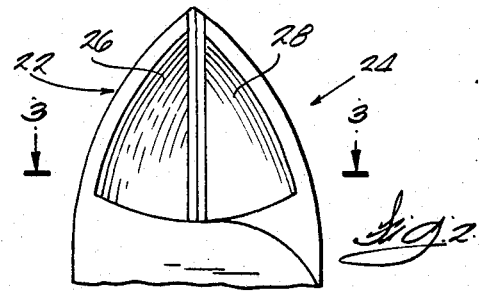
Fig. 2
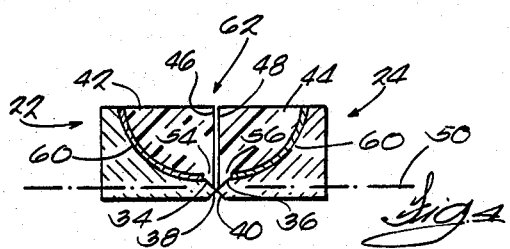
Fig. 4
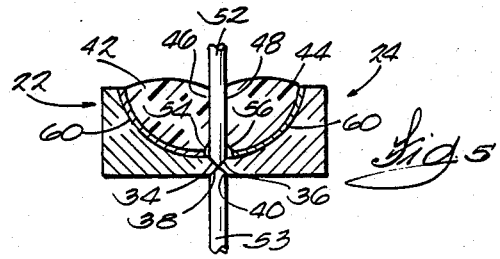
Fig. 5
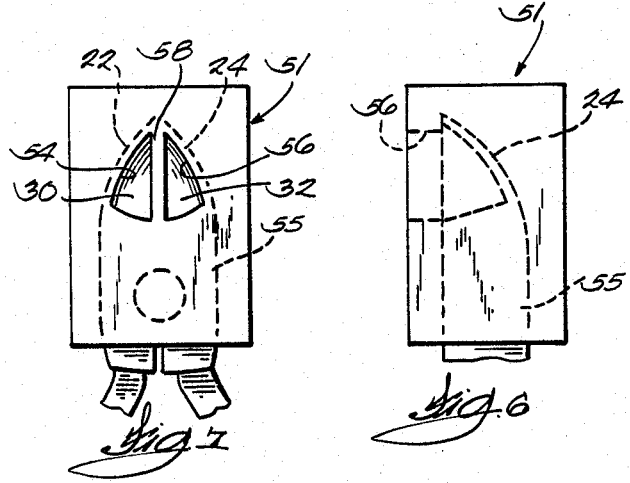
Fig. 7
Fig. 6
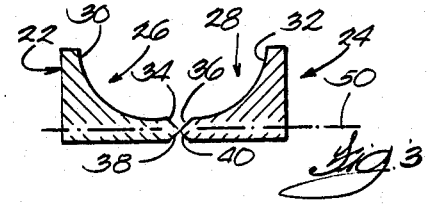
Fig. 3
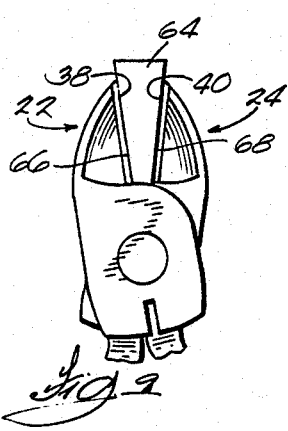
Fig. 9
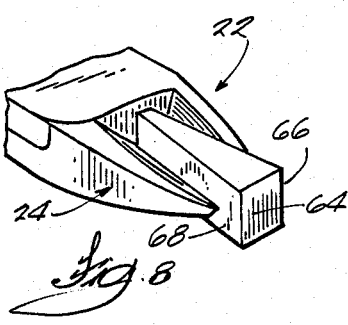
Fig. 8
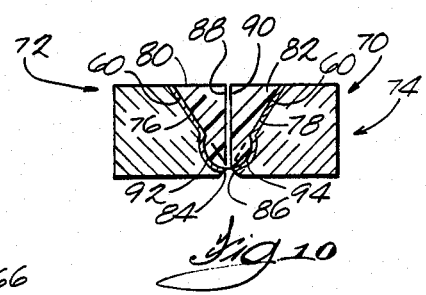
Fig. 10

WIRE CUTTER INCLUDING CLIPPED WIRE RETAINING MEANS

This invention relates to wire cutters and, more particularly, to wire cutters including means for catching and retaining a segment of the wire as it is clipped off a larger section of wire and methods for providing wire cutters with such retaining means.

In cutting a small segment off the end of a wire with wire cutters, the clipped segment often is propelled through the air at a rapid speed, creating a safety hazard to the user and/or others in the vicinity. This could be a severe problem in areas where a number of people working close to each other are using wire cutters. Also, when wire cutters are used to cut fine wire during assembly of electrical equipment, such as subassemblies for computers, clipped segments of fine wire can fall down into the equipment and often are difficult to locate. If not located, loose wire segments can cause a short circuit which can result in damage to the equipment, a hazardous condition such as a fire or explosion and even potential electrocution of the user.

One prior approach for solving this problem is to provide a catch arrangement which is mounted over one or both of the cutter jaws. One prior catch arrangement snaps over the cutter jaws and includes a pair of parallel-spaced, clamping members covered with a resilient material. As the cutter jaws are closed for cutting, the segment of wire being clipped is clamped between the clamping members. This catch is cumbersome, adds bulk to the cutter and cannot be used for applications where clearance is limited or on smaller wire cutters. Because of its snap-on construction, this catch can be knocked off during use. Also, the clamping members are spaced from the cutting edges and, therefore, cannot catch shorter wire segments.

Another prior catch arrangement disclosed in U.S. Pat. No. 4,023,270 includes a single clamping member which holds the clipped wire segment against the inside surface of one jaw. It also is cumbersome, adds bulk to the wire cutter and is not effective for catching and holding short segments of fine wire(s).

SUMMARY OF THE INVENTION

An object of the invention is to provide a wire cutter including simple, long lasting means for reliably retaining short wire segments of different lengths clipped from different types of wire and a wide range of wire sizes.

Another object of the invention is to provide such a retaining means which does not increase the outside dimensions of the wire cutter and cannot be accidentially knocked off during use.

A furher object of the invention is to provide such a retaining means which does not interfere with ordinary use of the wire cutter.

A still further object of the invention is to provide a method for adding such a retaining means to wire cutters of different types and sizes.

Other objects, aspects and advantages of the invention will become apparent to those skilled in the art upon reviewing the detailed description, the drawings and the appended claims.

The invention provides elastomeric gripping members mounted in the throat or the jaw portions of a wire cutter. The elastomeric gripping members have closely spaced, opposed inner faces which extend generally perpendicularly to the cutting plane of the wire cutter cutting edges and cooperate to clamp therebetween a wire segment as it is clipped off the end of the wire when the cutter jaws are closed. The gripping members preferably extend as close as possible to the cutting edges but are not attached to the cutting edges. This permits a portion of the gripping member to move laterally away from the cutting edges and thereby avoid interference with the cutting action.

The gripping members preferably are made from a polyurethane elastomer, preferably have a Durometer hardness of about 40 to about 100 Shore A, and preferably are formed in situ in the wire cutter throat.

In one method, the gripping members are cast in situ by roughing the surfaces of the throat, except for the cutting portions, applying a continuous film of a liquid bonding agent for a polyurethane elastomer prepolymer over the roughened surfaces, pouring a mixture of the polyurethane prepolymer and a curing agent into the cavity defined by the throat (and a mold for some wire cutters) with the jaws closed and, after the polyurethane is at least partially cured, cutting or otherwise forming a parting line through the polyurethane to produce the inner faces of the gripping members.

In another method, a mold is positioned between the open jaws of the wire cutter after the jaw surfaces have been roughened and a bonding material has been applied as mentioned above. The mold includes walls which abut and extend upwardly from the cutting edges and cooperate with the throat portions of the jaws to define a pair of pockets. A liquid mixture of the polyurethane prepolymer and curing agent is poured into these pockets and cured to form the cripping members.

BRIEF DESCRIPTION OF THE DRAWINGS

FIG. 1 is a perspective view of a plier-type wire cutter incorporating the invention.

FIG. 2 is an enlarged, fragmentary, perspective view of the jaws of the wire cutter in FIG. 1, shown prior to adding gripping members of the invention.

FIG. 3 is a sectional view taken generally along line 3—3 in FIG. 2.

FIG. 4 is a view similar to FIG. 3 shown after the gripping members have been added.

FIG. 5 is a view similar to FIG. 4 showing a segment of wire being held by the gripping members after being clipped from the end of a wire.

FIG. 6 is a side view of a shield used for blasting selective areas of the wire cutter jaws.

FIG. 7 is a top view of the blast shield shown in FIG. 5.

FIG. 8 is a fragmentary, perspective view illustrating the use of a mold in an alternate method for forming the gripping members in situ.

FIG. 9 is top view of the mold illustrated in FIG. 8.

FIG. 10 is a sectional view similar to FIG. 4 for a wire cutter having jaws with steep inside walls.

DESCRIPTION OF THE PREFERRED EMBODIMENTS

While the invention can be used for various types and sizes of wire cutters which tend to propel clipped wire segments or are used in applications where retention of clipped, small wire segments is desired, it is particularly adaptable for plier-type wire cutters and will be described in connection with that application.

FIG. 1 illustrates a conventional plier-type wire cutter 12 minus the gripping members of the invention. The wire cutter 12 has a pair of pivotally mounted arms or members 14 and 16 including respective handle portions 18 and 20 and respective opposed, cutting jaw portions 22 and 24. As best shown in FIGS. 2 and 3, the jaw portions 22 and 24 have recessed regions or throat portions 26 and 28 including bottom walls 30 and 32 which terminate in respective inclined cutting portions 34 and 36 and extend upwardly and outwardly therefrom. The cutting portions 34 and 36 have respective cutting edges 38 and 40. When the jaw portions 22 and 24 are closed to cut wire as illustrated in FIGS. 1–3, the cutting edges 38 and 40 mate and the walls 30 and 32 define a pocket or throat.

The invention provides means mounted in the throat for retaining small segments of wire as they are clipped off the ends of a wire. Referring to FIG. 4, such means comprises elastomeric gripping members 42 and 44 mounted in the throat portions 26 and 28 and having closely spaced, opposed inner faces 46 and 48 which extend generally perpendicularly to the cutting plane 50 of the cutting edges 38 and 40. The gripping member faces 46 and 48 preferably are planar. As a short segment 52 is clipped off the end of a wire 53, the gripping member faces 46 and 48 cooperate to clamp the wire segment 52 therebewteen as illustrated in FIG. 5.

The gripping member faces 46 and 48 are close enough to each other to clamp the smallest wire to be cut by the wire cutter 12. The gripping members 42 and 44 are made from an elastomeric material which has sufficient resiliency to permit the compression and/or deformation required to a portion of the faces to be displaced to accept the largest wire to be cut by the cutter. The elastomeric material also has a "memory" such that the gripping members, particularly the inner faces 46 and 48, return to their original configuration after wire segment is released and yet still is hard or stiff enough to securely grip a wire segment therebetween. The elastomeric material also should be wear resistant, abrasion resistant and resistant to petroleum products such as oil, grease, etc., and other materials which wire cutters commonly come in contact with during normal use. As a guide, the elastomeric material should have a Durometer hardness of generally of about 40 to about 100 Shore A with higher hardness materials being used for heavier and larger diameter wires.

Suitable elastomeric materials include natural and synthetic rubber compositions, elastomeric synethetic thermosetting and thermoplastic materials and polyurethane elastomers. Polyurethane elastomers presently are preferred because of their superior wear and resilient characteristics, particularly those based on ester- or ether-type prepolymers which are chain extended and-/or cross linked with suitable curing agents and heat. A particularly effective, commercially available polyurethane elastomer is Andur 90-AP, a polyether based liquid isocyanate-terminated prepolymer which can be cured with an amine based curing agent such as Curene 185, 4, 4'-methylene-bis (2-chloroaniline). Both of these products are marketed by Anderson Development Company, Adrian, Mich.

The gripping members 42 and 44 are securely mounted on the throat portions 26 and 28 by mechanical fasteners or are bonded thereto with an adhesive or the like. The gripping member faces 46 and 48 preferably extend as close as possible to the cutting edges 38 and 40 in order to provide the capability of gripping extremely short segments of fine wire. To accomplish this, the portions 54 and 56 of the gripping members 42 and 48 cover the inclined surfaces of the cutting portions 34 and 36. However, the portions 54 and 56 are free to move relative to the cutting portions of 34 and 36 so as not to interfere with the cutting action.

While the gripping members 42 and 44 can be formed into the desired configuration and then mounted on the throat portions 26 and 28, they preferably are molded in situ in a suitable manner.

In a preferred technique for forming the gripping members 42 and 44 in situ, the bottom walls 30 and 32 of the throat portions 26 and 28 are first roughened in a suitable manner such as by grinding, etching or preferably blasting with an abrasive material, such as a highly abrasive alumimum oxide blasting material. FIGS. 6 and 7 illustrate a shield 51 for use when a blasting material is used. The blast shield 51 which is made from an abrasion resistant material, such as polyurethane, includes a slot 55 into which the closed jaw portions 22 and 24 of the wire cutter 12 are inserted. The slot 55 includes top openings 54 and 56 having a shape corresponding to the areas of walls 30 and 32 which are to be roughened. A partition 58 separating the openings 54 and 56 covers the cutting portions 34 and 36 and protects them from exposure to the blast material which can cause dulling and possibly cause undesired bonding of the polyurethane to the cutting portions 34 and 36.

The blasting material is directed through the openings 54 and 56 to roughen the bottom walls 30 and 32 of the throat portions 26 and 28. Other suitable means can be used to prevent the cutting portions 34 and 36 from being exposed to the blasting material.

The roughened surfaces of the throat portions 26 and 28 are cleaned with a suitable solvent (e.g., methylene chloride, methyl ethel keytone, etc.) or the like to remove any oil, grease or other foreign materials which might interfere with the bonding of the polyurethane to the roughened surfaces.

The clean, roughened surfaces of the throat portions 26 and 28 are coated with a suitable liquid bonding material for bonding a liquid polyurethane elastomer to a metallic substrate during curing. As a guide, a suitable bonding material for the above-identified commerically available liquid prepolymer and curing agent is CONAP AD-1146, marketed by CONAP, Inc., Allegheny, N.Y. The bonding material can be applied by brushing, spraying or the like to obtain a continuous film 60 of the bonding material over the clean, roughened surfaces. To ensure that the polyurethane does not become bonded to the cutting portions 34 and 36 and interfere with cutting, the bonding material is not applied to the cutting portions. If desired, a masking material can be applied over the cutting portions 34 and 36 prior to applying the bonding material.

If multiple coats of the bonding material is used in order to obtain a film of the desired minimum thickness (e.g., 0.0015 inch), each coat is allowed to dry prior to applying the next coat and the final coat is allowed to dry before casting the polyurethane. If desired, the wire cutter can be heated (e.g., to about 160° F.) to expedite drying.

In one method for casting the griping members 42 and 44 in situ, the wire cutter 12 is placed in a fixture (not shown) with the jaw portions 22 and 24 closed and oriented so that the pocket or throat defined by the throat portions can be substantially filled with a mixture of the liquid polyethylene prepolymer and the curing agent. The jaw portions of some wire cutters are shaped so that, when closed, they do not provide a well-defined pocket or throat capable of holding a liquid polyurethane. Such wire cutters are placed in a mold (not shown) arranged to surround a portion of the jaw portions and act as a dam for preventing the liquid polyurethane from running out of the pocket or throat.

The throat portions 26 and 28 (and the mold if used) preferably is preheated to a temperature approaching the curing temperature of the polyurethane prepolymer. This prevents a thermal shock which can adversely affect the film of bonding material or cause cracking in the cured polyurethane. The curing reaction is usually exothermic so the preheat temperature can be somewhat lower than the curing temperature, for example, a preheat temperature of approximately 200° F. can be used for a polyurethane prepolymer which cures at 230°-245° F. The drying cycle for the final cost of the bonding material can be part of the preheat cycle.

After the preheat cycle, a heated, liquid mixture of the liquid polyuretyane prepolymer and curing agent is cast or poured into the pocket or throat defined by the jaw portions (and a mold if used). The pocket or throat preferably is substantially filled with the liquid mixture.

After the polyurethane is allowed to partially cure to a cheese-like state, the wire cutter is removed from the holding fixture (and the mold if used) and heated in an oven or the like to complete curing of the polyurethene, for example, heated to about 210°-215° F. for about 4 to 6 hours.

Referring to FIG. 4, a parting line 62, extending generally perpendicularly to the cutting plane 50 of the cutting edges 34 and 36 and generally coincidential with the mating joint of the cutting edges 38 and 40, is formed through the polyurethane with a knife or the like. The opposite sides of the parting line 62 comprise the inner faces 46 and 48 of the gripping members 42 and 44. If desired, the parting line 62 can be formed by clamping between the cutting edges 38 and 40 a piece of very thin material that serves as a partition dividing the pocket or throat in half. Each part is filled with the liquid mixture and the parting line 62 is formed by opening the jaw portions and removing the partition after the polyurethane is at least partially cured. The parting line 62 can be formed after partial or final curing.

FIGS. 8 and 9 illustrate an alternate method for casting the gripping members 42 and 44 in situ. In this method, the jaw portions 22 and 24 are opened and a generally, V-shaped mold 64 is placed therebetween. The mold 64 has vertically extending walls 66 and 68 which abut respective cutting edges 38 and 40 and cooperate with respective throat portions 26 and 28 to define separate pockets into which the mixture of liquid polyurethane prepolymer and curing agent is poured to the desired depth, after the mold 64 and the jaw portions 22 and 24 have been preheated as discussed above. The mold 64 is removed after the polyurethane has been partially cured and the wire cutter 12 is heated to complete curing as described above.

The inner surfaces of the mold walls 66 and 68 form the inner faces 46 and 48 of the grippig members 42 and 44.

Referring back to FIG. 5, the resilient characteristic of the polyurethane permits the unbonded portions 54 and 56 of the gripping members 42 and 44 to move laterally away from the cutting portions 34 and 36. Also, the gripping members 42 and 44, which are compressed to accommodate the wire segment clamped therebetween, securely grips the wire segment until the user opens the jaw portions, thereby eliminating the hazard of propelled wire segments and problems associated with wire segments dropping into electrical equipment and the like. In some cases, shorter sements of fine wire actually adhere to an inner face of one gripping member until physically removed, thereby providing further protection against segments of fine wire falling into unwanted areas.

FIG. 10 illustrates a wire cutter 70 including jaw portions 72 and 74 having relatively steep inside walls 76 and 78. As illustrated by the dashed lines, the lateral dimension of portions of the gripping members 80 and 82 close to the cutting edges 84 and 86 ordinarily is quite small, resulting in limited lateral compressibility. Consequently, when a coated (e.g., plastic-coated) wire is cut, the inner faces 88 and 90 of the gripping members 80 and 82 cannot move laterally far enough to prevent the wire coating from being permanently compressed or crimped and, instead of being securely gripped by the inner faces 88 and 90, the clipped wire segment tends to fall from between the gripping members.

This problem can be minimized by forming hollow portions 92 and 94 in the inner walls 76 and 78 of the jaw portions 72 and 74 adjacent the cutting portions as illustrated by the solid lines in FIG. 10. The hollow portions 92 and 94 are filled with polyurethane during the casting operation and the additional material affords the necessary lateral movement of the inner faces 88 and 90 to prevent permanent compression or crimping of the wire coating.

From the foregoing description, one skilled in the art can easily ascertain the essential characteristics of the invention and, without departing from the spirit and scope thereof, make various changes and modifications to adapt it to various usages.

I claim:

1. A wire cutter comprising
a pair of pivotally mounted members including handle portions and opposed jaw portions, each having a recessed region including a bottom wall terminating in a cutting portion said cutting portions having edges which mate and said bottom walls defining a pocket when said jaw portions are closed to cut wire; and
means for retaining a small segment of wire as it is clipped from a larger section of wire including
elastomeric gripping members disposed in said recessed regions and having closely spaced, opposed inner faces which extend generally perpendicularly to the cutting plane of said cutting edges and cooperate to clamp a clipped segment of wire therebetween when said jaw portions are closed, each of said gripping members extending over a substantial portion of the respective cutting portion and bonded to the respective bottom wall by an intervening layer of a bonding agent except for a portion adjacent said cutting portion which is completely free to move relative to said cutting portion when a wire is being cut.

2. A wire cutter according to claim 1 wherein each of said gripping members is made from a polyurethane elastomer.

3. A wire cutter according to claim 2 wherein said gripping members are molded in situ in said recessed regions.

4. A wire cutter according to claim 3 wherein said resulting polyurethane has a Durometer hardness of about 40 to about 100 Shore A.

5. A wire cutter according to claim 3 wherein a portion of the surfaces of said bottom walls corresponding to regions to which said gripping members are to be bonded is roughened and a continuous film of said bonding agent for said polyurethane is applied over said roughened surfaces prior to molding said gripping members thereto.

6. A method for providing a wire cutter with means for retaining a small segment of wire as it is clipped from a larger section of a wire, the wire cutter including a pair of pivotally mounted members including handle portions and opposed jaw portions, each having a recessed region including a bottom wall terminating in a cutting portion, the cutting portions having edges which mate and the walls of the recessed regions defining a pocket when the jaw portions are closed to cut wire, said method comprising the steps of
  (a) roughening a portion of the surfaces of the bottom walls of the recessed regions other than the cutting portions;
  (b) applying a continuous film of a bonding agent for a liquid polyurethane elastomer prepolymer over the roughened portions but not the cutting portions;
  (c) with the jaw portions closed, pouring a liquid mixture of the prepolymer and a curing agent into the pocket defined by the recessed regions;
  (d) at least partially curing the polyurethane; and
  (e) forming through the polyurethane a parting line extending generally perpendicularly to the cutting plane of the cutting edges and generally coincidental with the mating joint between the cutting edges.

7. A method according to claim 6 wherein said prepolymer is an ester- or ether-type polyurethane elastomer which is chain extended and/or cross linked with a curing agent and heat.

8. A method according to claim 7 wherein the Durometer hardness of the resulting polyurethane is about 40 to about 100 Shore A.

9. A method for providing a wire cutter with means for retaining a small segment of wire as it is clipped from a larger section of wire, the wire cutter including a pair of pivotally mounted members having handle portions and opposed jaw portions, each having a recessed region including a bottom wall terminating in a cutting portion, the cutting portions having edges which mate and the walls of the recessed regions defining a pocket when the jaw portions are closed to cut wire, said method including the steps of
  (a) roughening a portion of the surfaces of the bottom walls of the recessed regions other than the cutting portions;
  (b) applying a continuous film of a bonding agent for a liquid polyurethane elastomer prepolymer over the roughened portions but not the cutting edge portions;
  (c) with the jaw portions open, positioning therebetween a mold part having walls abutting the cutting edges and extending upwardly therefrom generally perpendicularly to the cutting plane of the cutting edges and cooperating with the respective recessed region to define a pair of pockets;
  (d) pouring into each pocket a liquid mixture of the prepolymer and a curing agent;
  (e) at least partially curing the polyurethane; and
  (f) removing the mold from the jaw portions.

10. A method according to claim 9 wherein said prepolymer is an ester- or ether-type polyurethane elastomer which is chain extended and/or cross linked with a curing agent and heat.

11. A method according to claim 10 wherein the Durometer hardness of the resulting polyurethane is about 40 to about 100 Shore A.

* * * * *